United States Patent [19]
Oshima et al.

[11] Patent Number: 4,812,525
[45] Date of Patent: Mar. 14, 1989

[54] POLYBUTADIENE RUBBER COMPOSITION

[75] Inventors: Noboru Oshima, Suzuka; Yoshishige Chikatsu; Toshiaki Fukuhori, both of Yokkaichi; Tatsuro Hamada; Tatsuo Fujimaki, both of Higashimurayama, all of Japan

[73] Assignees: Japan Synthetic Rubber Co., Ltd.; Bridgestone Corporation, both of Tokyo, Japan

[21] Appl. No.: 74,172

[22] Filed: Jul. 16, 1987

[30] Foreign Application Priority Data

Sep. 8, 1986 [JP] Japan .................................. 61-209616

[51] Int. Cl.$^4$ .............................................. C08F 8/42
[52] U.S. Cl. ............................ 525/232; 525/237; 525/333.2; 525/370; 525/371; 525/372
[58] Field of Search ............... 525/232, 237, 333.2, 525/370

[56] References Cited

U.S. PATENT DOCUMENTS 4,224,197  9/1980  Ueda et al. ........................ 525/237
4,383,085  5/1983  Fujimaki et al. .................. 525/237

FOREIGN PATENT DOCUMENTS 87736    9/1983  European Pat. Off. .
57-100146 6/1982  Japan .
58-122939 7/1983  Japan .
2102437  2/1983  United Kingdom .

*Primary Examiner*—Joseph L. Schofer
*Assistant Examiner*—Bernard Lipman
*Attorney, Agent, or Firm*—Sughrue, Mion, Zinn, Macpeak & Seas

[57] ABSTRACT

A rubber composition is disclosed which contains, as a rubber component, 20-100% by weight of (A) polybutadiene polymerized by using a lithium initiator and 80 to 0% by weight of (B) another rubber component. The polybutadiene has the following physical properties (i)-(v):

(i) The molecular weight distribution of Mw/Mn is 1.4 to 3.0 in which Mw and Mn are a weight average molecular weight and a number average molecular weight, respectively;
(ii) A polymer component having the molecular weight being not more than $10^5$ when calculated as polystyrene is from 7 to 25%;
(iii) The content of bound vinyl groups is from 10 to 25%;
(iv) The content of tin atoms bonded to the polymer by tin-carbon bonds is not less than 50 ppm;
(v) Mooney viscosity (ML$_{1+4}$, 100° C.) is from 20 to 70.

8 Claims, No Drawings

POLYBUTADIENE RUBBER COMPOSITION

BACKGROUND OF THE INVENTION (1) Field of the Invention:

The present invention relates to a rubber composition for tires which contains novel polybutadiene.

(2) Related Art Statement:

Heretofore, in order to maintain abrasion resistance, high cis 1,4-polybutadiene as well as natural rubber, high cis 1,4-polyisoprene and styrenebutadiene copolymer have been used in rubber compositions for tire treads. However, rubber compositions containing high cis 1,4-polybutadiene are inferior in that dispersing speed of carbon black as a reinforcing material is slow and its dispersibility is poor during kneading by a Banbury mixer, a plast mill or the like. If the dispersibility of carbon black into a rubber composition is attempted to be improved, there occurs problems that the rubber composition is liable to burn or gelate. If the dispersibility of carbon black is poor, there occur various problems that extrusion skin is bad when a kneaded composition is extruded, dimensional stability in the extrusion is poor, and an extruding speed is low.

On the other hand, if rubber compositions containing low cis 1,4-polybutadiene containing 10 to 30% of bound vinyl groups is used instead of high cis 1,4-polybutadiene, there are problems in terms of physical properties of vulcanizates that abrasion resistance and breaking strength are poor, although the problems during kneading are lessened.

SUMMARY OF THE INVENTION

It is an object of the present invention to provide a rubber composition containing novel polybutadiene so as to solve the problems during kneading and the problems in terms of abrasion resistance and breaking strength of vulcanizates thereof.

Upon having made various studies, the present inventors have found out that the rubber composition containing polybutadiene which has a specific molecular structure and contains tin-carbon bonds in polymer molecules has excellent dispersibility of carbon black on kneading and excellent breaking strength and abrasion resistance of the vulcanizates, and consequently accomplished the present invention.

According to the present invention, there is provided a rubber composition containing, as a rubber component, 20–100% by weight of (A) polybutadiene polymerized by using a lithium initiator and 80 to 0% by weight of (B) another rubber component, the polybutadiene (A) having the following physical properties (i) to (v)

(i) The molecular weight distribution of Mw/Mn is 1.4 to 3.0 in which Mw and Mn are a weight average molecular weight and a number average molecular weight, respectively;

(ii) A polymer component having the molecular weight being not more than $10^5$ when calculated as polystyrene is from 7 to 25%;

(iii) The content of bound vinyl groups is from 10 to 25%;

(iv) The content of tin atoms bonded to the polymer by tin-carbon bonds is not less than 50 ppm; and (v) Mooney viscosity ($ML_{1+4}$, 100° C.) is from 20 to 70.

These and other objects, features, and advantages of the present invention will be well appreciated upon reading of the following description of the invention, with the understanding that some modifications, variations, and changes of the same could be made by the skilled person in the art to which the invention pertains without departing from the spirit of the invention or the scope of claims appended hereto.

DETAILED DESCRIPTION OF THE INVENTION

Now, the present invention will be explained in more detail below.

The molecular weight distribution of Mw/Mn of the polybutadiene (A) in the present invention is from 1.4 to 3.0 in which Mw and Mn are the weight average molecular weight and the number average molecular weight, respectively. If Mw/Mn is less than 1.4, the dispersibility of carbon black during kneading is poor. On the other hand, if it is over 3.0, breaking strength and abrasion resistance of the vulcanizate are poor. The molecular weight distribution of Mw/Mn is preferably from 1.6 to 2.5. In addition to the molecular weight distribution, the ratio of the polymer component falling in a lower molecular weight range is also important for the polybutadiene (A) according to the present invention. It is necessary that the polybutadiene contains 7 to 25% by weight of a polymer component having the molecular weight of not more than $10^5$ when calculated as polystyrene. If the content is less than 7% by weight, the dispersibility of carbon black during kneading is poor and breaking strength is also deteriorated. If it is over 25% by weight, breaking strength and abrasion resistance are poor.

The microstructure of the polybutadiene (A) composed of cis, trans and vinyl bonds according to the present invention is specified by the content of bound vinyl groups which influence a glass transition temperature. The content of bound vinyl groups is from 10 to 25%. If polybutadiene contains less than 10% of bound vinyl bonds, it is difficult to produce it by polymerization using a lithium initiator. If it is unfavorably over 25%, the dispersibility of carbon black is poor, and abrasion resistance and breaking strength of the vulcanizate are poor.

Tin atoms bonded in the polybutadiene (A) according to the present invention through tin-carbon bonds serve to promote the dispersion of carbon black in the polybutadiene during kneading and improve breaking strength and abrasion resistance of the vulcanizate. The tin-carbon bonds in the polybutadiene may be bonds between tin atoms and polybutadiene molecules or bonds between tin atoms and alkyl groups, aryl groups, cycloalkyl groups, allyl groups, etc.

Preferable is a molecular structure in which a tin compound is attached to terminals of polybutadiene and more preferable is a molecular structure in which tin atoms have at least one substituent selected from an aryl group and an arylmethyl group.

The content of the tin atoms in the polybutadiene is measured by an atomic-absorption spectroscopy, and is not less than 50 ppm, preferably not less than 150 ppm. If it is less than 50 ppm, the dispersibility of carbon black during kneading is not sufficient and abrasion resistance or breaking strength of the vulcanizate is not improved. If it is over 2000 ppm, there is a tendency that a kneaded mass breaks, an extrusion speed is lowered, and an extruded shape is deteriorated. Thus, the content is preferably not more than 1600 ppm.

The Mooney viscosity ($ML_{1+4}$, 100° C.) of the polybutadiene (A) according to the present invention is from 20 to 70. If it is less than 20, abrasion resistance and breaking strength are poor, while if it exceeds 70, heat generation becomes larger during kneading to raise a temperature so that the rubber composition readily gelates. Further, the dispersibility of carbon black is poor and the processability is deteriorated. Thus, more than 70 is unfavorable.

For example, the polybutadiene (A) of the present invention may be obtained by polymerizing 1,3-butadiene continuously charged into a reactor with use of an organic lithium initiator in a hydrocarbon solvent and then adding one or more kinds of the following tin compounds at an outlet of the reactor. The tin compounds include tin tetrachloride, butyltin trichloride, dioctyltin dichloride, dibutyltin dichloride, tributyltin chloride, triphenyltin chloride, triphenyltin bromide, tribenzyltin chloride, tritolyltin chloride, triphenyltin ethoxide, diphenyldibutyltin, diphenyldimethyltin, ditolyltin dichloride, diphenyltin dioctanate, diphenyltin dilaurate, diphenyltin distearate, dimethyltin dichloride, tetravinyltin, dibutyltin dioctanate, divnyldiethyltin, tetrabenzyltin, dibutyltin distearate, tetraaryltin, p-tolylbutyltin styrene, dibutyltin dilaurate, dioctyltin dilaurate, and tributyltin laurate. Alternatively, the polybutadiene (A) may be also obtained by batch polymerizing 1,3-butadiene in the presence of a hydrocarbon solvent with use of an organic lithium initiator and then adding the above-mentioned tin compound or compounds thereto.

The polybutadiene (A) of the present invention is used in an amount of not less than 20% by weight, preferably not less than 30% by weight relative to the whole rubber component. Only polybutadiene may be used as the rubber component. If the amount is less than 20% by weight, the rubber composition having excellent abrasion resistance cannot be obtained.

As the rubber component of the rubber composition according to the present invention, other rubber component (B) may be blended in addition to the above-mentioned polybutadiene rubber (A). For instance, the rubber component (B) may include diene rubbers such as natural rubber, high cis 1,4-polyisoprene rubber, high cis 1,4-polybutadiene rubber, styrene-butadiene copolymer rubber (SBR) containing from 10 to 40% by weight of bound styrene, etc. One or more kinds of these diene rubbers may be blended to the above polybutadiene rubber. Particularly, the polybutadiene (A) of the present invention may be used favorably when being blended with natural rubber and/or SBR. It is preferable that polybutadiene (A) of the present invention:-natural rubber and/or SBR is from 30 to 80:70 to 20 (ratio by weight).

As carbon black used in the rubber composition according to the present invention, various kinds of carbon black having different grain sizes and structures, such as FEF, GPF, HAF, ISAF, etc., applicable in ordinary rubber industry, may be used. Particularly, high reinforcing carbon black such as ISAF, IISAF, HAF, etc. having an iodine adsorption amount of not less than 80 mg/g and a dibutylphthalate oil absorbing amount of not less than 100 ml/100 g are preferred. Carbon black is used in an amount of 20 to 80 parts by weight, preferably from 30 to 70 parts by weight, per 100 parts by weight of the rubber component. As a rubber extender oil used in the present invention, a petroleum oil such as aromatic oil, naphthenic oil, paraffinic oil, etc. may be used. Oil may preliminarily be added to the above-mentioned polybutadiene (A) after butadiene is partially polymerized.

A vulcanizate may be obtained from the rubber composition according to the present invention by adding carbon black, an extender oil, and various rubber chemicals such as a vulcanizer, e.g., sulfur, a vulcanization accelerator, a vulcanization aid, an antioxidant, etc. to the rubber component, kneading and compounding a resulting mixture by means of rolls, Banbury mixer or the like, and then vulcanizing a compounded mixture.

The present invention will be explained in more detail with reference to the following examples. However, these examples are merely given in illustration of the invention, but never limit the scoped thereof.

PRODUCTION OF POLYBUTADIENE (A)

Sample A

Polybutadiene (A) (Sample A) having a specified structure to be used in the present invention was obtained by the following continuous polymerization method.

Two rectors having an inner volume of 10 liters and L/D=1.5 were connected together in series, and were each equipped with a stirrer and a jacket. In a first reactor, 1,3-butadiene placed in a reactor bottom was added with 1,3-butadiene containing 150 ppm of 1,2-butadiene, cyclohexane, and n-butyllithium at rates of 2.25 kg/hour, 9.00 kg/hour, and 1.8 g/hour, respectively. While a temperature inside the reactor was controlled at 95° C., a polymer solution overflowing from an upper portion of the reactor was continuously extracted, which was led to a bottom of a second reactor together with cyclohexane (containing 3.79 g per 200 g of triphenyltin chloride) added at a rate of 200 g/hour. While a temperature inside the reactor was maintained at 70° to 80° C., triphenyltin groups were introduced into terminals of the polymer. Butyl hydroxy toluene was added as a stabilizer in an amount of 0.7 part by weight per 100 parts by weight of the polymer to a polymer solution overflowing from an upper portion of the second reactor. Solvent was removed through steam stripping, and the polymer was recovered by drying on heating rollers. The resulting polymer had Mooney viscosity of 36, a vinyl content of 12% (Morero's method), a molecular weight distribution of Mw/Mn of 1.8 (measured by a gel permeation chromatogram), a rate of a low molecular weight polymer component having a molecular weight of not more than $10^5$ when calculated as polystyrene being 18% by weight and a content of tin atoms in the polymer of 500 ppm.

Sample B

Sample B was obtained by the same method as in Sample A except that tetrahydrofuran diluted with cyclohexane was fed to the first reactor at a rate of 2.7 g/hour. Mooney viscosity, a vinyl content, a molecular weight distribution of Mw/Mn, a rate of a low molecular weight polymer component having a molecular weight of not more $10^5$ when calculated as polystyrene, and a content of tin atoms were 35, 22%, 1.9, 19% by weight, and 500 ppm, respectively.

Sample C

Sample A was prepared by the same method as in Sample A except that tetrahydrofuran diluted with cyclohexane was fed to the first reactor at a rate of 9.8 g/hour.

Mooney viscosity, a vinyl content, a molecular weight distribution of Mw/Mn, a rate of a low molecular weight polymer component having a molecular weight of not more than $10^5$ when calculated as polystyrene, and a content of tin atoms were 35, 30%, 1.9, 18% by weight, and 490 ppm, respectively.

Sample D

Sample D was prepared by the same method as in Sample A except that n-butyllithium and cyclohexane containing 0.96 g per 200 g of triphenyltin chloride were added at rates of 2.2 g/hour and 200 g/hour, respectively.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 37, 12%, 1.8, 16% by weight, and 150 ppm, respectively.

Sample E

Sample E was prepared by the same method as in Sample A except that n-butyllithium was fed at a rate of 1.7 g/hour instead of 1.8 g/hour and cyclohexane containing 7.58 g per 200 g of triphenyltin chloride instead of 3.79 g was fed at a rate of 200 g/hour.

Mooney viscosity, a vinyl content, a molecular weight distribution of Mw/Mn, a rate of a low molecular weight polymer component having not more than $10^5$ when calculated as polystyrene, and a content of tin atoms in the polymer were 36, 12%, 1.7, 20% by weight, and 1060 ppm, respectively.

Sample F

Sample F was prepared by the same method as in Sample A except that n-butyllithium was added at a rate of 2.3 g/hour, instead of 1.8 g/hour, and divinylbenzene was added at a rate of 0.46 g/hour, while a mixture of cyclohexane/toluene (1:1 by weight ratio) was fed at a rate of 9.00 kg/hour instead of cyclohexane as a solvent.

Mooney viscosity, a vinyl content, a molecular weight distribution of Mw/Mn, a rate of a low molecular weight polymer component having not more than $10^5$ when calculated as polystyrene, and a content of tin atoms in the polymer were 35, 14%, 3.2 22% by weight, and 480 ppm, respectively.

Sample G

Sample G was prepared by the same method as in Sample A except that n-butyllithium was fed at a rate of 2.2 g/hour instead of 1.8 g/hour. Mooney viscosity, a vinyl content, a molecular weight distribution of Mw/Mn, a rate of a low molecular weight polymer component having not more than $10^5$ when calculated as polystyrene were 17, 13%, 1.8, 22% by weight, and 490 ppm, respectively.

Sample H

Sample H was prepared by the same method as in Sample A except that n-butyllithium was fed at a rate of 1.5 g/hour instead of 1.8 g/hour. Mooney viscosity, a vinyl content, a molecular weight distribution of Mw/Mn, a rate of a low molecular weight polymer component having not more than $10^5$ when calculated as polystyrene, and a content of tin atoms in the polymer were 52, 12%, 1.8, 12% by weight, and 490 ppm, respectively.

Sample I

Sample I was prepared by the same method as in Sample A except that n-butyllithium was fed at a rate of 1.3 g/hour instead of 1.8 g/hour. Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 80, 12%, 1.8, 8% by weight, and 485 ppm, respectively.

Sample J

Sample J was prepared by the same method as in Sample E except that no triphenyltin chloride was used. In the thus obtained polymer, Mooney viscosity, a vinyl content, a molecular weight distribution of Mw/Mn, and a rate of a low molecular weight polymer component having a molecular weight of not more than $10^5$ when calculated as polystyrene were 33, 12%, 1.6, and 17% by weight, respectively.

Sample K

Sample K was prepared in the following manner.

500 g of 1,3-butadiene, 2500 g of cyclohexane, and 0.45 g of n-butyllithium were charged into a 5-liter reactor, which were subjected to a batch polymerization at 60° C. for 25 minutes. Then, after addition of 0.20 g of tetrachlorotin, a mixture was reacted for 20 minutes. A thus obtained polymer had Mooney viscosity of 35, a vinyl content of 12%, a molecular weight distribution of Mw/Mn of 1.7, a rate of a low molecular weight polymer component having a molecular weight of not more than $10^5$ when calculated as polystyrene being 4% by weight, and content of tin atoms in the polymer of 180 ppm.

Sample L

Sample L was prepared by the same method as in Sample A except that n-butyllithium and 1,3-butadiene containing 300 ppm of 1,2-butadiene were fed at a rate of 1.6 g/hour instead of 1.8 g/hour and at a rate of 2.25 kg/hour, respectively, while a temperature inside the reactor was controlled at 105° C.

Mooney viscosity, a vinyl content, a molecular weight distribution of Mw/Mn, a rate of a low molecular weight polymeer component having a molecular weight of not more than $10^5$ when calculated as polystyrene, and a content of tin atoms in the polymer were 37, 12%, 2.5, 15% by weight, and 500 ppm, respectively.

Sample M

Sample M was prepared by the same method as in Sample L except that the temperature inside the reactor was controlled at 112° C.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 38, 12%, 3.0, 20% by weight, and 505 ppm, respectively.

Sample N

Sample N was prepared by the same method as in Sample K except that n-butyllithium was used in an amount of 0.50 g instead of 0.45 g, and 1.26 g of tributyltin chloride was used instead of 0.2 g of tetrachlorotin.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 34, 14%, 1.2, 5% by weight, and 920 ppm, respectively.

Sample O

Sample 0 was prepared by the same method as in Sample L except that n-butyllithium was fed at a rate of 4.5 g/hour instead of 1.8 g/hour.

Mooney viscosity, a vinyl content, a rate of a low molecular weight component having a molecular weight of not more than $10^5$ when calculated as polystyrene, and a content of tin atoms in the polymer were 25, 12%, 2.4, 27% by weight, and 500 ppm, respectively.

Sample P

Sample P was prepared by the same method as in Sample C except that tetrahydrofuran was fed at a rate of 9.0 g/hour.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 36, 25%, 1.9, 17% by weight, and 490 ppm, respectively.

Sample Q

Sample Q was prepared by the same method as in Sample A except that 200 g/hour of cyclohexane containing 0.37 g per 200 g of tributyltin chloride was used instead of 200 G/hour of cyclohexane containing 3.79 g per 200 g of triphenyltin chloride.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 34, 12%, 1.8, 17% by weight, and 60 ppm, respectively.

Sample R

Sample R was prepared by the same method as in Sample A except that 200 g/hour of cyclohexane containing 0.22 g per 200 g of tributyltin chloride was used instead of 200 g/hour cyclohexane containing 3.79 g per 200 g of triphenyltin chloride.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 34, 12%, 1.8, 17% by weight, and 35 ppm, respectively.

Sample S

Sample S was prepared by the same method as in Sample K except that n-butyllithium was used in an amount of 0.6 g instead of 0.45 g and 2.54 g of triphenyltin chloride was used instead of 0.2 g of tetrachlorotin.

Mooney viscosity, a vinyl content, a molecular weight distribution of Mw/Mn, and a rate of a low molecular weight polymer component having a molecular weight of not more than $10^5$ when calculated as polystyrene, and a content of tin atoms in the polymer were 21, 13%, 1.7, 10% by weight, and 1540 ppm, respectively.

Sample T

Sample T was prepared by the same method as in Sample A except that n-butyllithium was used at a rate of 1.3 g/hour instead of 1.8 g/hour.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 70, 12%, 1.8, 11% by weight, and 500 ppm.

Sample U

Sample U was prepared by the same method as in Sample A except that n-butyllithium was fed at a rate of 3.9 g/hour instead of 1.8 g/hour and 200 g/hour of cyclohexane containing 15.0 g per 200 g of triphenyltin chloride was used instead of 200 g/hour of cyclohexane containing 3.79 g per 200 g of triphenyltin chloride.

Mooney viscosity, a vinyl content, a molecular weight distribution of Mw/Mn, a rate of a low molecular weight polymer component having a molecular weight of not more than $10^5$ when calculated as polystyrene, and a content of tin atoms in the polymer were 35, 13%, 2.0, 22% by weight, and 2050 ppm, respectively.

EXAMPLES 1 TO 14 AND COMPARATIVE EXAMPLES 1 TO 12

A rubber component shown in Tables 1 to 2 was added and kneaded with carbon black, stearic acid, zinc oxide, and oil at a compounding recipe shown in Table 3 in a B-type Banbury mixer having an inner volume of 1.7 liters set at 50° C. (a casing temperature). A reaction mixture was dumped out 2 minutes and 45 seconds after the kneading was started.

A thus kneaded composition was used for the evaluation and measurement of dispersion of carbon black and the Garvey die extrusion property. The composition was vulcanized by kneading a vulcanization accelerator and sulfur at 2 m/m by means of a 10-inch roll nip and then vulcanizing the resulting composition at 170° C. for 20 minutes.

The dispersion of carbon black was evaluated according to ASTM D-2663 method.

The extrusion property was evaluated according to ASTM D-2230 method-A.

Tensile strength of the vulcanizates was evaluated according to JIS K6301.

Abrasion resistance was measured according to ASTM D-2228 (PICO Abrader).

Results are shown in Tables 1 and 2.

TABLE 1

| | | Example | | | | | | Comparative Example | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| Polymer | A | 50 | 70 | | | | | | | | | | | |
| | B | | | 50 | | | | | | | | | | |
| | C | | | | | | | 50 | | | | | | |
| | D | | | | 50 | | | | | | | | | |
| | E | | | | | 50 | | | | | | | | |

TABLE 1-continued

|  | Example |  |  |  |  |  | Comparative Example |  |  |  |  |  |  |
|---|---|---|---|---|---|---|---|---|---|---|---|---|---|
|  | 1 | 2 | 3 | 4 | 5 | 6 | 1 | 2 | 3 | 4 | 5 | 6 | 7 |
| F |  |  |  |  |  |  | 50 |  |  |  |  |  |  |
| G |  |  |  |  |  |  |  | 50 |  |  |  |  |  |
| H |  |  |  |  | 50 |  |  |  |  |  |  |  |  |
| I |  |  |  |  |  |  |  |  |  | 50 |  |  |  |
| J |  |  |  |  |  |  |  |  |  |  | 50 |  |  |
| K |  |  |  |  |  |  |  |  |  |  |  | 50 |  |
| Natural rubber | 50 | 20 | 50 | 50 | 30 | 50 | 50 | 50 | 50 | 50 | 50 | 50 | 50 |
| 1502*(1) |  | 10 |  |  |  |  |  |  |  |  |  |  |  |
| BR01*(2) |  |  |  |  | 20 |  |  |  |  |  |  |  | 50 |
| Carbon dispersion index | 98 | 98 | 97 | 97 | 98 | 97 | 94 | 95 | 94 | 95 | 95 | 92 | 92 |
| Garvey die extrusion test |  |  |  |  |  |  |  |  |  |  |  |  |  |
| Extrusion speed (cm/min) | 540 | 640 | 550 | 540 | 540 | 520 | 550 | 520 | 680 | 350 | 500 | 540 | 400 |
| Shape evaluation | 16 | 16 | 16 | 16 | 16 | 16 | 15 | 14 | 16 | 13 | 15 | 16 | 14 |
| Tensile strength (kg · f/cm²) | 250 | 230 | 245 | 245 | 270 | 260 | 220 | 200 | 200 | 245 | 229 | 210 | 217 |
| Tensile elongation (%) | 550 | 540 | 550 | 550 | 560 | 560 | 520 | 560 | 570 | 500 | 550 | 520 | 630 |
| Hardness (JIS-A) | 63 | 62 | 63 | 63 | 63 | 64 | 64 | 63 | 63 | 66 | 64 | 64 | 63 |
| Abrasion resistance index | 180 | 190 | 170 | 170 | 200 | 190 | 150 | 160 | 150 | 150 | 144 | 160 | 170 |

*(1)Styrene-butadiene copolymer (JSR-1502 manufactured by Japan Synthetic Rubber Co., Ltd., bound styrene content: 23.5 wt %)
*(2)High cis 1,4-polybutadiene rubber (manufactured by Japan Synthetic Rubber Co., Ltd., Mooney viscosity 45, cis-1,4: 95%, Tin content: 0 ppm, Mw/Mn: 4.5)

TABLE 2

|  |  | Example |  |  |  |  |  |  |  | Comparative Example |  |  |  |  |
|---|---|---|---|---|---|---|---|---|---|---|---|---|---|---|
|  |  | 7 | 8 | 9 | 10 | 11 | 12 | 13 | 14 | 8 | 9 | 10 | 11 | 12 |
| Polymer | A |  |  |  |  |  |  | 30 | 100 |  |  |  | 15 |  |
|  | U |  |  |  |  |  |  |  |  |  |  |  |  | 50 |
|  | L | 50 |  |  |  |  |  |  |  |  |  |  |  |  |
|  | M |  | 50 |  |  |  |  |  |  |  |  |  |  |  |
|  | N |  |  |  |  |  |  |  |  | 50 |  |  |  |  |
|  | O |  |  |  |  |  |  |  |  |  | 50 |  |  |  |
|  | P |  |  | 50 |  |  |  |  |  |  |  |  |  |  |
|  | Q |  |  |  | 50 |  |  |  |  |  |  |  |  |  |
|  | R |  |  |  |  |  |  |  |  |  |  | 50 |  |  |
|  | S |  |  |  |  | 50 |  |  |  |  |  |  |  |  |
|  | T |  |  |  |  |  | 50 |  |  |  |  |  |  |  |
|  | Natural rubber | 50 | 50 | 50 | 50 | 50 | 50 | 70 | 0 | 50 | 50 | 50 | 85 | 50 |
| Carbon dispersion index |  | 97 | 96 | 96 | 96 | 97 | 96 | 96 | 97 | 92 | 94 | 95 | 92 | 96 |
| Garvey die extrusion text |  |  |  |  |  |  |  |  |  |  |  |  |  |  |
| Extrusion speed (cm/min) |  | 530 | 530 | 550 | 530 | 580 | 530 | 530 | 560 | 530 | 700 | 500 | 490 | 350 |
| Shape evaluation |  | 16 | 16 | 16 | 16 | 16 | 16 | 16 | 16 | 13 | 15 | 15 | 14 | 12 |
| Tensile strength (kg · f/cm²) |  | 245 | 235 | 230 | 230 | 240 | 250 | 270 | 220 | 200 | 195 | 220 | 270 | 230 |
| Tensile elongation (%) |  | 550 | 540 | 540 | 540 | 540 | 560 | 570 | 520 | 490 | 490 | 500 | 570 | 540 |
| Hardness (JIS-A) |  | 63 | 63 | 64 | 63 | 63 | 64 | 64 | 63 | 64 | 62 | 63 | 64 | 65 |
| Abrasion resistance index |  | 180 | 175 | 180 | 170 | 175 | 190 | 170 | 190 | 150 | 120 | 140 | 150 | 170 |

TABLE 3

|  | (parts by weight) |
|---|---|
| Polymer | 100 |
| ISAF | 55 |
| High aromatic process oil | 10 |
| Zinc oxide | 4 |
| Stearic acid | 2 |
| N—oxydiethylene-2-benzothiazol sulfenamide | 0.6 |
| Dibenzothiazyl sulfide | 0.15 |
| Sulfur | 2.0 |

As obvious from the above Tables, according to the present invention, the rubber component contains not less than a specified quality of the polybutadiene in which the molecular weight distribution, the content of the low molecular weight component, the bound vinyl content, and Mooney viscosity fall within the respectively specified ranges and the content of the tin-carbon bonds in the polymer is not less than the specified quality in the rubber component. Thereby, the rubber composition having excellent kneading processability, and breaking strength and abrasion resistance as a vulcanizate and being suitable for tires can be obtained.

What is claimed is:

1. A rubber composition containing, as a rubber component, 20–100% by weight of (A) polybutadiene polymerized by using a lithium initiator and having the following physical properties (i) to (v):
   (i) The molecular weight distribution of Mw/Mn is 1.4 to 3.0 in which Mw and Mn are a weight average molecular weight and a number average molecular weight, respectively;
   (ii) A polymer component having the molecular weight being not more than $10^5$ when calculated as polystyrene is from 7 to 25%;
   (i) The content of bound vinyl groups is from 10 to 25%;
   (iv) The content of tin atoms bonded to the polymer by tin-carbon bonds is not less than 50 ppm; and
   (v) Mooney viscosity ($ML_{1+4}$, 100° C.) is from 20 to 70, and 80 to 0% by weight of (B) another rubber component.

2. A rubber composition according to claim 1, wherein the molecular weight distribution of Mw/Mn is from 1.6 to 2.5.

3. A rubber composition according to claim 1, wherein the content of the tin atoms bonded to the polymer by tin-carbon bonds is from 150 ppm to 1600 ppm.

4. A rubber composition according to claim 1, wherein the tin atoms are bonded to the polymer by tin-carbon bonds by using one or more kinds of tin compounds selected from the group consisting of tin tetrachloride, butyltin trichloride, dioctyltin dichloride, dibutyltin dichloride, tributyltin chloride, triphenyltin chloride, triphenyltin bromide, tribenzyltin chloride, tritolyltin chloride, triphenyltin ethoxide, diphenyldibutyltin, diphenyldimethyltin, ditolyltin dichloride, diphenyltin dioctanate, diphenyltin dilaurate, diphenyltin distearate, dimethyltin dichloride, tetravinyltin, dibutyltin dioctanate, divinyldiethyltin, tetrabenzyltin, dibutyltin distearate, tetraaryltin, p-tolylbutyltin styrene, dibutyltin dilaurate, dioctyltin dilaurate, and tributyltin laurate.

5. A rubber composition according to claim 1, which contains not less than 30% by weight of the polybutadiene polymer as the rubber component.

6. A rubber composition according to claim 1, wherein the another rubber component (B) is at least one kind of a diene rubber selected from the group consisting of natural rubber, high cis 1,4-polyisoprene rubber, high cis 1,4-polybutadiene rubber, and styrene-butadiene copolymer rubber containing from 10 to 40% by weight of bound styrene.

7. A rubber composition according to claim 6, wherein the another rubber component is natural rubber and/or styrene-butadiene copolymer rubber.

8. A rubber composition according to claim 7, wherein a weight ratio of the polybutadiene rubber:-natural rubber and/or styrene butadiene copolymer rubber is from 30 to 80:70 to 20.

* * * * *